United States Patent
Korada et al.

(10) Patent No.: US 11,924,872 B2
(45) Date of Patent: Mar. 5, 2024

(54) PRIORITIZATION IN AERONAUTICAL SATELLITE NETWORKS

(71) Applicant: Hughes Network Systems, LLC, Germantown, MD (US)

(72) Inventors: Suresh Kumar Korada, Boyds, MD (US); Guy Bryan Montgomery, Potomac, MD (US); Rithambara Sriraman, Clarksburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 114 days.

(21) Appl. No.: 17/139,755

(22) Filed: Dec. 31, 2020

(65) Prior Publication Data
US 2022/0210792 A1   Jun. 30, 2022

(51) Int. Cl.
| | |
|---|---|
| *H04W 72/56* | (2023.01) |
| *H04B 7/185* | (2006.01) |
| *H04B 7/204* | (2006.01) |
| *H04L 5/00* | (2006.01) |
| *H04W 72/044* | (2023.01) |

(52) U.S. Cl.
CPC ........ *H04W 72/56* (2023.01); *H04B 7/18584* (2013.01); *H04B 7/2041* (2013.01); *H04L 5/0025* (2013.01); *H04W 72/046* (2013.01)

(58) Field of Classification Search
CPC .......................... H04W 72/10; H04W 72/046; H04B 7/18584; H04B 7/2041; H04L 5/0025
See application file for complete search history.

(56) References Cited

U.S. PATENT DOCUMENTS

| | | | |
|---|---|---|---|
| 6,404,760 B1* | 6/2002 | Holtzman | H04B 1/71072 370/335 |
| 10,158,420 B1* | 12/2018 | Montsma | H04W 64/006 |
| 2013/0279334 A1* | 10/2013 | Xu | H04L 47/125 370/235 |
| 2014/0045420 A1 | 2/2014 | Tong | |
| 2016/0119054 A1* | 4/2016 | Foxworthy | H04B 7/18571 370/319 |
| 2016/0183142 A1* | 6/2016 | Foxworthy | H04L 61/4511 370/331 |
| 2018/0234166 A1* | 8/2018 | Peponides | H04L 47/823 |
| 2018/0324580 A1* | 11/2018 | Phuyal | H04B 7/15507 |

(Continued)

OTHER PUBLICATIONS

Cell Association in Energy-Constrained Unmanned Aerial Vehicle Communications Under Altitude Consideration (Year: 2019).*

(Continued)

*Primary Examiner* — Kodzovi Acolatse
*Assistant Examiner* — Anindita Sen
(74) *Attorney, Agent, or Firm* — NovoTechIP International PLLC (57) ABSTRACT

Systems and methods implementing prioritization of network resources in an aeronautical satellite network system, which determines network utilization of a beam of the aeronautical satellite system by a plurality of aircraft using network capacity of the beam, where network demand in the beam indicated by the network utilization is greater than capacity of the beam, share network bandwidth of the beam to the plurality of aircraft based on a service priority factor, where the service priority factor may depend on altitude of the plurality of aircraft in the beam.

19 Claims, 7 Drawing Sheets

(56) References Cited

U.S. PATENT DOCUMENTS

| | | | |
|---|---|---|---|
| 2019/0044611 A1* | 2/2019 | Treesh | H04W 36/24 |
| 2019/0191334 A1* | 6/2019 | Montsma | H04W 28/085 |
| 2019/0222299 A1* | 7/2019 | Treesh | H04B 7/2041 |
| 2019/0372669 A1* | 12/2019 | Ziegler | H04B 10/503 |
| 2020/0037219 A1* | 1/2020 | Kumar | H04W 36/08 |
| 2020/0244345 A1 | 7/2020 | Goettle | |
| 2020/0275461 A1 | 8/2020 | Sullivan | |
| 2022/0029695 A1* | 1/2022 | Lekutai | H04L 5/1469 |
| 2022/0158724 A1* | 5/2022 | Kumar | H04W 28/06 |
| 2022/0182089 A1* | 6/2022 | Kim | H04B 1/12 |

OTHER PUBLICATIONS

International Search Report and Written Opinion dated Apr. 12, 2022 in corresponding PCT/US2021/065579.

\* cited by examiner

| # of Aricraft above Altitude Threshold | Service Priority Factor |
|---|---|
| 0 - 2 | 1 |
| 3 - 4 | 0.5 |
| 5 - 6 | 0.2 |
| 7 and above | 0.1 |

PRIORITIZATION IN AERONAUTICAL SATELLITE NETWORKS

BACKGROUND

Aeronautical satellite network systems provide internet service to systems and passengers aboard private and commercial aircraft via a satellite connection. The performance of the aeronautical satellite network system may be best when the aircraft is at cruising altitude. Aircraft flying at cruising altitude are above cloud cover, are not subject to weather conditions and get uninterrupted service at best efficiencies. Aircraft below cruising altitude or on the ground may be below cloud cover and are subject to weather conditions. Due to cloud cover or other weather conditions, aircraft below cruising altitude may require the use of lower efficiency modulation schemes to maintain the satellite link. The lower efficiency modulations may cause lower efficiencies for the satellite link, and may also cause overall lower efficiency on what can be sent over the outroute connection in the satellite beam.

Regulatory permission has been granted to provide internet service on aircraft from gate-to-gate, including while at cruising altitude. Where network bandwidth is limited on satellite network systems, service providers may have to balance service priority between aircraft using the aeronautical satellite network.

SUMMARY

In aeronautical satellite network systems there is a need to balance the service priority between multiple aircraft that may be located in a single satellite beam and thus sharing network bandwidth of that beam. As introduced above, weather plays a role in service efficiency for planes with cloud cover which often exits below cruising altitude. A service level agreement between service providers and the airlines is typically directed to service at cruising altitude above cloud cover. Providing gate-to-gate service by the service provider should not sacrifice the service level agreement for bandwidth at cruising altitude. As described herein, this goal may be achieved by prioritizing service to aircraft at cruising altitude above service to aircraft below cruising altitude. The prioritizing of the aircraft may be based on real-time usage of available capacity in the satellite beam where the aircraft is flying and environmental conditions such as altitude. Real time adjustment of this priority based on available capacity and environmental conditions ensures traffic is served to aircraft below cruising altitude if available without impacting service to aircraft above cruising altitude.

This Summary identifies example features and aspects and is not an exclusive or exhaustive description of the disclosed subject matter. Whether features or aspects are included in or omitted from this Summary is not intended as indicative of relative importance of such features. Additional features and aspects are described, and others will become apparent to persons skilled in the art upon reading the following detailed description and viewing the drawings that form a part thereof.

An example of disclosed methods can include a method for prioritization in an aeronautical satellite network system, where the method includes determining network utilization of a beam of the aeronautical satellite network system by a plurality of aircraft using network capacity of the beam; determining whether the demand in the beam indicated by network utilization is greater than the capacity of the beam; upon determining the network demand in the beam indicated by the network utilization is greater than capacity of the beam, sharing network bandwidth of the beam to the plurality of aircraft based on a service priority factor.

An example of disclosed systems can include an aeronautical satellite network system which includes a terrestrial gateway configured to communicate with a satellite; a mobility network access point configured to provide network resources to a plurality of aircraft through the terrestrial gateway; an aggregator configured to receive capacity utilization of network communication to the plurality of aircraft within a beam of the satellite and determines a service priority factor, wherein the mobility network access point is configured to shares network bandwidth of the beam to the plurality of aircraft based on the service priority factor.

An example of disclosed systems can include an aeronautical satellite network system which includes a terrestrial gateway configured to communicate with a satellite; a mobility network access point configured to provide network resources to a plurality of aircraft through the terrestrial gateway; a plurality of network IP processors in the mobility network access point; an aggregator configured to: receive network capacity utilization reports of network utilization by the plurality of aircraft, receive a report of a number of the plurality of aircraft above and a number of the plurality of aircraft below an altitude threshold on a per beam basis, use the number of the plurality of aircraft above and the number of the plurality of aircraft below the altitude threshold and the capacity utilization for the beam to determine a service priority factor, and send the service priority factor to the network IP processors; wherein the plurality of network IP processors are configured to use the service priority factor to limit bandwidth to individual aircraft of the plurality of aircraft serviced by each of the plurality of network IP processors.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples to provide a thorough understanding of the disclosed subject matter. It may become apparent to persons of ordinary skill in the art, though, upon reading this disclosure, that one or more disclosed aspects may be practiced without such details. In addition, description of various example implementations according to this disclosure may include referencing of or to one or more known techniques or operations, and such referencing can be at relatively high-level, to avoid obscuring of various concepts, aspects and features thereof with details not particular to and not necessary for fully understanding the present disclosure.

As used in this disclosure, in one implementation, the terms "cell," "beam" and "spot beam" are interchangeable, as each cell is covered by, i.e., is within one spot beam and each spot beam covers one cell. As used in this disclosure, the phrase "based on" will be understood to mean based at least in part on, except where otherwise stated or made clear from the context to have a different meaning.

Systems and methods according to this disclosure describe an aeronautical satellite network system to provide network service to aircraft. The system prioritizes service to aircraft based on environmental condition such as cruising altitude, where priority may be given to aircraft above cruising altitude compared to service given to aircraft below cruising altitude. The prioritizing of the aircraft may be based on real-time usage of available capacity in the satellite beam where the aircraft is flying in addition to altitude.

Figure 1:
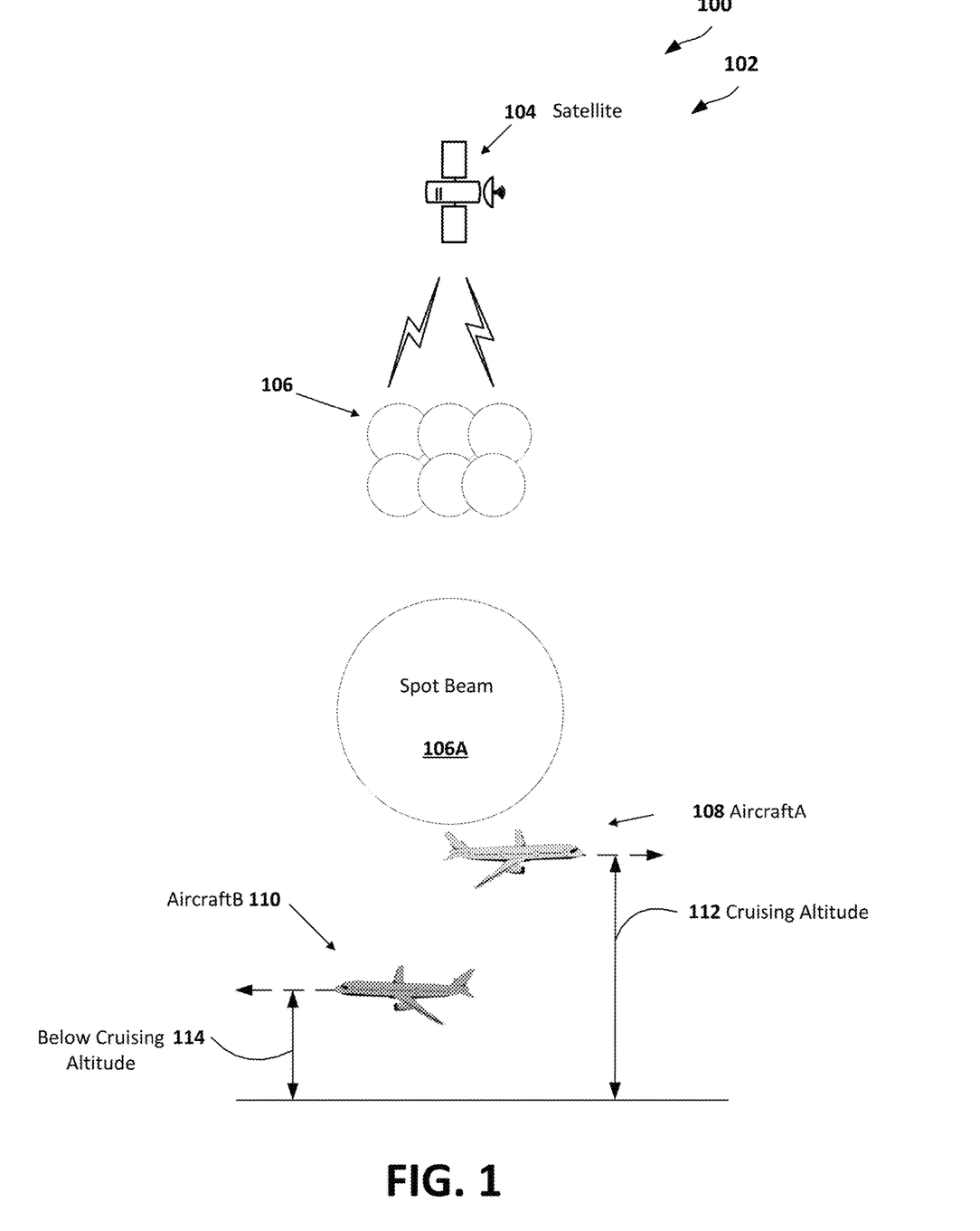
FIG. 1 is a high-level diagram representing the aircraft portion of an aeronautical satellite network system that provides internet service to systems and passengers aboard private and commercial aircraft via a satellite connection.

FIG. 1 is a high-level diagram representing the aircraft communication portion 102 of an aeronautical satellite network system 100 that provides internet service to systems and passengers aboard private and commercial aircraft via a satellite connection. As used hereinafter, the aeronautical satellite network system 100 or "system 100" incudes the aircraft communication portion 102 and ground communication portion 202 described below. The aircraft communication portion 102 includes a satellite 104 that produces a number of spot beams 106. A spot beam is a communication signal of a particular frequency or frequencies covering a limited geographic area of the earth's surface called a cell. Receivers in the cell area on the earth's surface or above the earth's surface in the cell area can receive the satellite signal at the spot beams particular frequencies. The spot beams 106 represent communication beams originating at the satellite 104 that each cover a specific area or cell. Spot beams 106 typically have a certain amount of overlap as shown. Each spot beam 106 may communicate to aircraft over multiple carrier frequencies where equipment on the aircraft is capable of receiving those carrier frequencies.

FIG. 1 further illustrates a spot beam 106A which represents a specific beam of the spot beams 106 at a lower altitude above the earth. At any one time, one or more aircraft may be within spot beam 106A. For illustration purposes, two aircraft, AircraftA 108 and AircraftB 110 are shown below beam 106A to represent the two aircraft within the spotbeam. However, it should be understood that many aircraft may be within the area of the spot beam 106A at any given time at different locations and altitudes. In FIG. 1, AircraftA 108 is shown at a cruising altitude 112, and AircraftB 110 is shown below cruising altitude 114.

As used herein, below cruising altitude 114 may include any altitude below cruising altitude 112, down to and including grounded aircraft. Further, the term cruising altitude 112 as used herein does not necessarily refer to any specific altitude, but it may represent an arbitrary altitude considered to typically lie above cloud cover. Alternatively, the term could refer to an altitude that may be defined in a service level agreement between a service provider and a customer. The cruising altitude 114 will typically be indicated by the aircraft being above a certain altitude within some margin. For example, the cruising altitude 114 may be indicated when the aircraft is above a certain altitude with some hysteresis to prevent the aircraft from indicating the aircraft moving above and below cruising altitude. As an example, the cruising altitude may be set at 10,000 feet with a 10% hysteresis. In this example, the system could consider an aircraft is at cruising altitude when it rises above 10,000 feet, but it would not consider the aircraft below cruising altitude until dropping by 10%, to below 9000 feet.

Figure 2:
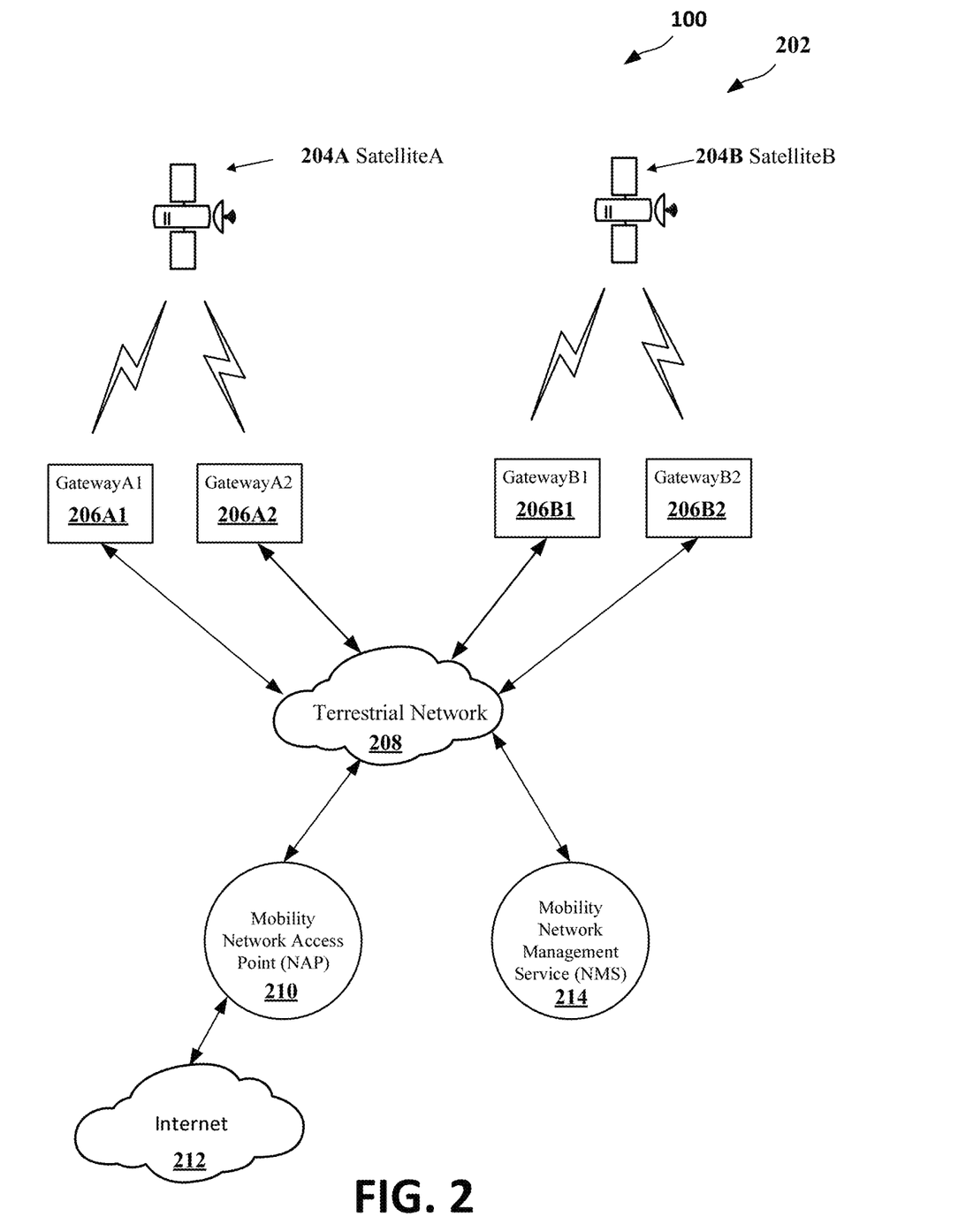
FIG. 2 is a high-level diagram representing the ground communication portion of an aeronautical satellite network system that provides internet service to systems and passengers aboard private and commercial aircraft via a satellite connection.

FIG. 2 is a high-level diagram representing the ground communication portion 202 of an aeronautical satellite network system 100 that provides internet service to systems and passengers aboard private and commercial aircraft via a satellite connection. The ground communication portion 202 includes one or more satellites. The illustrated example includes two satellites, SatelliteA 204A and SatelliteB 204B (collectively referred to as satellites 204). Each of the satellites 204 communicate with one or more ground based gateways. In the illustrated example, each satellite is shown communicating with two gateways, where SatelliteA 204A communicates with GatewayA1 206A1 and GatewayA2 206A2, and SatelliteB 204B communicates with GatewayB1 206B1 and GatewayB2 206B2 (collectively referred to as gateways 206). While the satellites 204 are each shown to communicate with two gateways 206, it should be understood that any number of gateways could communicate with any particular satellite 204. The gateways 206 are described further below.

Referring again to FIG. 2, The gateways 206 are connected to other parts of the system 100 over a terrestrial network 208. The terrestrial network may include wired networks, optical fibers, radio networks, switches and other components known in the art to provide ground-based network connections. The terrestrial network 208 provides connection of the gateways 206 to a mobility access point (NAP) 210. The NAP 210 provides network IP processors to connect aircraft users to the internet 212 as described further below. The terrestrial network 208 further provides connection of the gateways 206 to a mobility network management service (NMS) 214. The mobility NMS 214 is the central management component of the aeronautical satellite network system 100. The mobility NMS 214 maintains and delivers configuration information to each of the components of the system, including the ModMan 310 in the Aircraft (described below) and the various other components in the gateway 206 and the mobility NAP 210.

Figure 3A:
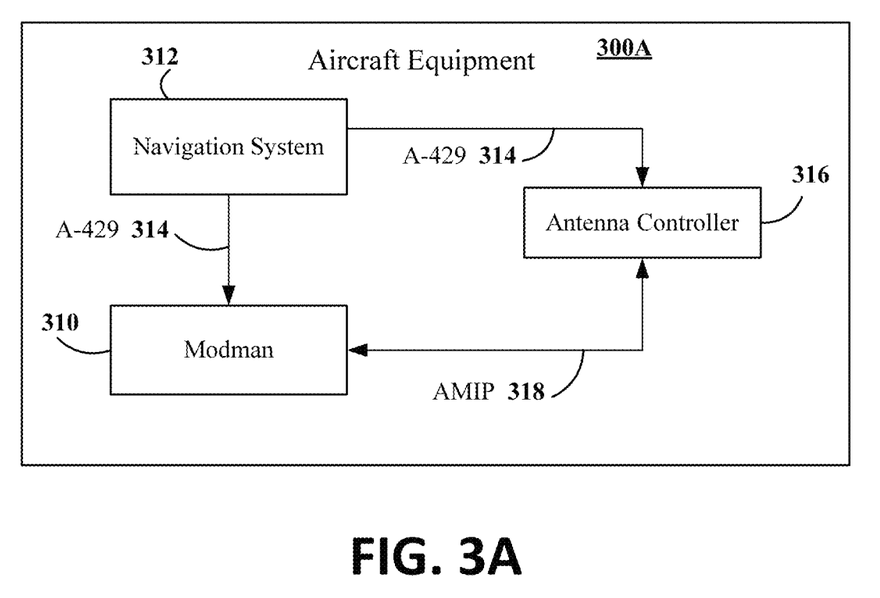
FIG. 3A is a block diagram for an example of aircraft-based equipment of the aeronautical satellite network system.

FIG. 3A is a block diagram of an example of aircraft-based equipment 300A of the aeronautical satellite network system. In this example, the aircraft-based equipment 300A includes a modem manager (ModMan) 310. The ModMan 310 includes the functionality of an airborne satellite communications modem with an airborne server. The ModMan is connected to aircraft's navigation system 312 to receive information such as altitude of the aircraft. The ModMan 310 may be connected to the navigation system 312 over a standard A-429 bus 314. The aircraft-based equipment further includes an antenna controller 316 that controls an antenna (not shown). The antenna controller 316 may be connected to the navigation system over an A-429 bus 314. The A-429 bus is an industry standard avionics data bus used in commercial aircraft and also known as the Aeronautical Radio INC. (ARINC) 429. The antenna controller 316 may be connected to the ModMan 310 using an AMIP interface 318. The AMIP interface 318 is an open-source antenna-modem interface protocol (AMIP) standard for antenna-router integration sometimes referred to as Open-AMIP. The ModMan 310 uses altitude information received from the navigation system to report its altitude state to the network IP processor with which it is associated and updates the state when it changes. The altitude is used determine whether the aircraft is above or below cloud cover by reporting at or below cruising altitude. The aircraft may report at or below cruising altitude with a hysteresis as described above to prevent frequent toggling of the aircraft's altitude status.

Figure 3B:
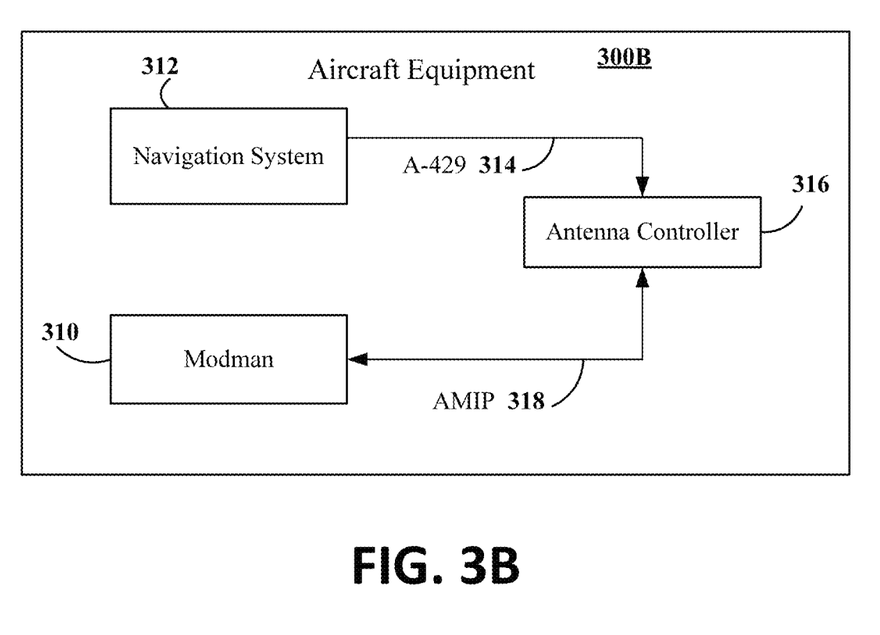
FIG. 3B is a block diagram for another example of aircraft-based equipment of the aeronautical satellite network system.

FIG. 3B is a block diagram of another example of aircraft-based equipment 310B of the aeronautical satellite network system. In this example, the aircraft-based equipment 310B also includes a modem manager (ModMan) 310. In this example, the ModMan 310 is not directly connected to the aircraft's navigation system 312. Here, the antenna controller 316 is connected to the navigation system and to the ModMan 310. The antenna controller 316 may be connected to the navigation system over the A-429 bus 314 and connected to the ModMan 310 using an AMIP bus 318. In this example, the ModMan 310 receives altitude information from the navigation system 312 through the antenna controller 316 to report whether the aircraft is at or below cruising altitude to the network IP processors.

Figure 4:
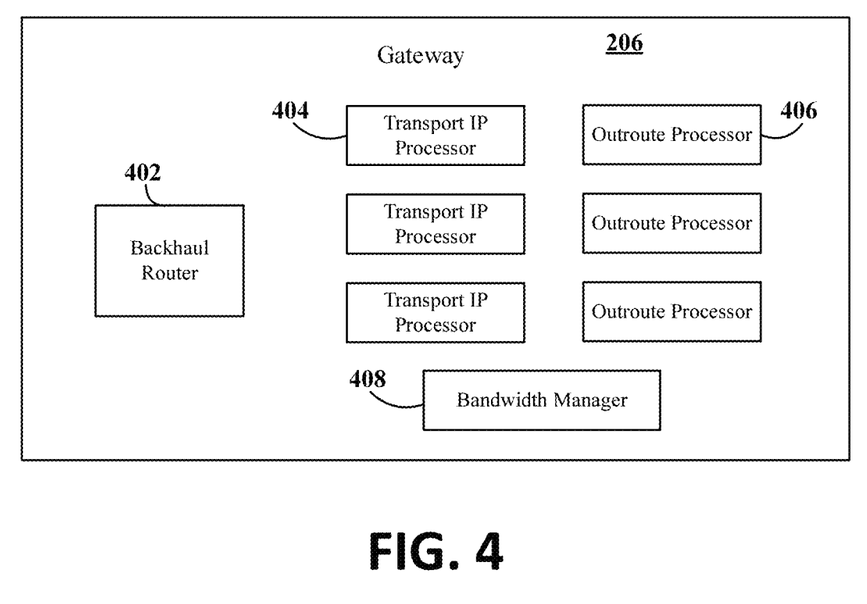
FIG. 4 is a block diagram of a gateway of the aeronautical satellite network system.

FIG. 4 is an example block diagram of a gateway 206 of the aeronautical satellite network system 100. The gateway 206 is a ground-based system to receive signals from the satellites 104, 204 via an antenna (not shown). The system 100 may include many gateways 206 dispersed at various geographic locations. The gateway 206 processes the signals received from the satellites 104, 204 and sends network traffic via the terrestrial network 208 to the mobility NAP 210 (see FIG. 2). The backhaul router 402 connects the gateway 206 with the mobility NAP 206. Data flows from the backhaul router 402 to one of transport IP processors 404. Data then flows to an outroute processor 406 to the modem in the aircraft over the satellite connection described above. The bandwidth manager 408 handles division of bandwidth across multiple customers through the transport IP processors 404. The bandwidth manager 408 also provides capacity utilization percentage of each beam to the aggregator, such that the service priority factor can be computed based on real time utilization as described below. The transport IP processor support traffic flows to aircraft located in the corresponding beam.

Figure 5:
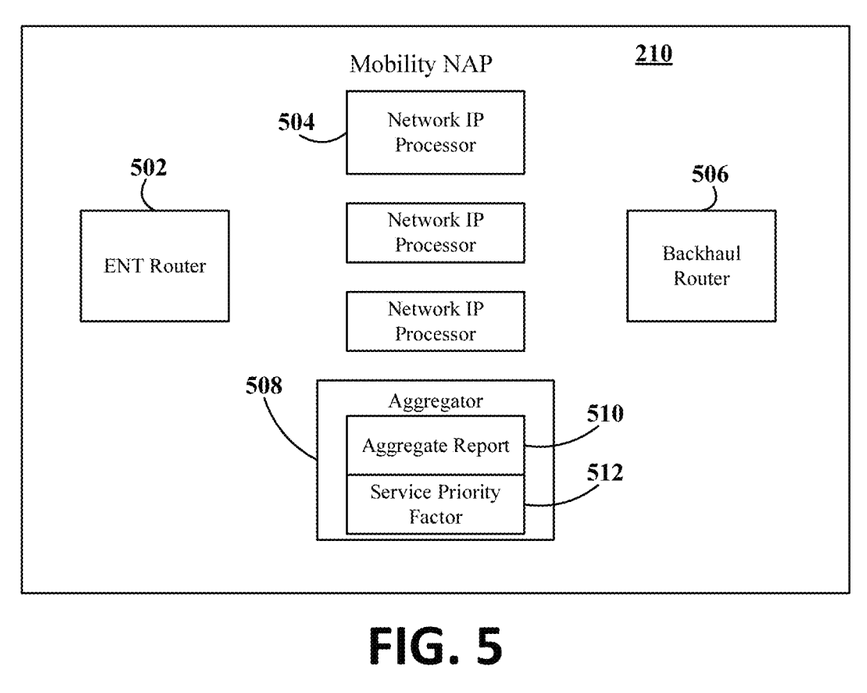
FIG. 5 is a block diagram of a mobility network access point of the aeronautical satellite network system.

FIG. 5 is a block diagram of a mobility network access point (NAP) 206 of the aeronautical satellite network system. Data flows to and from the internet 212 (FIG. 2) through the ENT router 502 connected to the network IP processors 504. The network IP processors connect to the gateway 206 through a backhaul router 506. A modem on each plane, such as modman 310 introduced above, is associated with a network IP processor 504 via a transport IP processor 404 on the gateway 206. The mobility NAP 210 further includes an aggregator 508. Each Network IP processor 504 sends to the aggregator 508 at the mobility NAP 210 a report of number of aircraft above and below the altitude threshold on a per beam basis. The aggregator at the mobility NAP 210 also receives capacity utilization for each beam from the bandwidth manager 408 in the gateways 206. The aggregator 508 combines these reports and to compute a total utilization in the form of an aggregate report 510. The aggregator 508 then calculates a service priority factor 512 that is a function of capacity utilization in the beam. The calculated service priority factor is sent to the network IP processors. The network IP processors use the service priority factor to reduce bandwidth of the service as described below.

The network IP processors 504 in the mobility NAP 201 use the service priority factor 512 received from the aggregator 508 to reduce the service priority of any aircraft that are below the altitude threshold and share network bandwidth of a beam. When there are multiple aircraft active in a beam, and total utilization is less than available capacity in the beam, bandwidth demand by each aircraft is served in its entirety. However, when the available capacity is inadequate, bandwidth is shared based on effective service priority indicated by the service priority factor and demand by each aircraft, while ensuring no starvation for any aircraft. The service priority factor may be applied only if there are non-zero number of aircraft above the cruising altitude threshold. Since these aircraft may be associated with different network IP processors, the bandwidth sharing may be accomplished in at least two levels. First, bandwidth sharing may be accomplished across different network IP processors. In this case, bandwidth sharing may be done via bandwidth demands specific to each beam. Bandwidth demands are sent to transport IP processors that reflect number of active aircraft, and aircraft's effective service priority in each Network IP Processor and getting bandwidth allocation appropriately distributed.

The second level of bandwidth sharing may be done for aircraft within the same network IP processor. Bandwidth sharing across multiple aircraft within the same Network IP Processor may be accomplished by limiting bandwidth allocation and adjusting scheduling periodicity based on effective service priority and bandwidth demand by each aircraft. The priority is shared to ensure no starvation of any aircraft and ensure that allocated bandwidth is not left unused when there is demand for it.

The service priority factor 512 is an algebraic weighting factor that can be applied to available bandwidth to reduce bandwidth serving one or more aircraft to effectively limit and share bandwidth as described herein. Two specific examples of implementing a service prior factor 512 will be described. However, it is contemplated that other service priority factor schemes could be implemented within the scope of the description and claims herein. In these two examples, the service priority factor is in the range of 0 to 1. In the first example, the service priority factor is a step function based on number of aircraft at cruising altitude or above the cruising altitude threshold. In the second example, the service priority factor 512 is a function of capacity utilization of the beam. These two examples are described further below.

Figure 6:
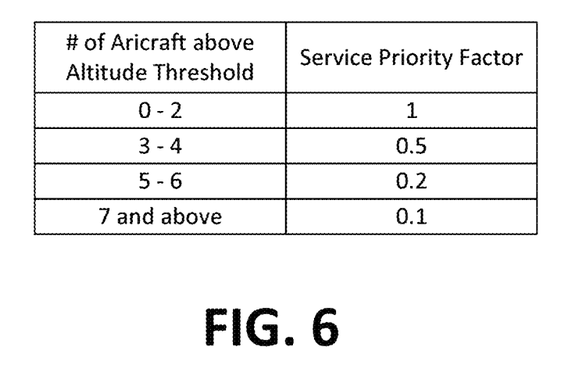
FIG. 6 is a data table representing an example implementation of a service priority factor.

FIG. 6 is a data table representing an example implementation of a service priority factor. In this example, the service priority factor is a step function based on number of aircraft at cruising altitude or above the cruising altitude threshold. This example assumes an aircraft at cruising altitude is generally going to be busy, and number of aircraft at cruising altitude in a beam will be related to capacity utilization of the beam. In the example data table shown in FIG. 6, where the number of aircraft above the altitude threshold is 0 to 2, then the service priority factor is 1.0 and where the number of aircraft above the altitude threshold is 3 to 4 the service priority factor is 0.5. Similarly, where the number of aircraft above the altitude threshold is 5 to 6, then the service priority factor is 0.2 and where the number of aircraft above the altitude threshold is above 7 the service priority factor is 0.1.

Figure 7:
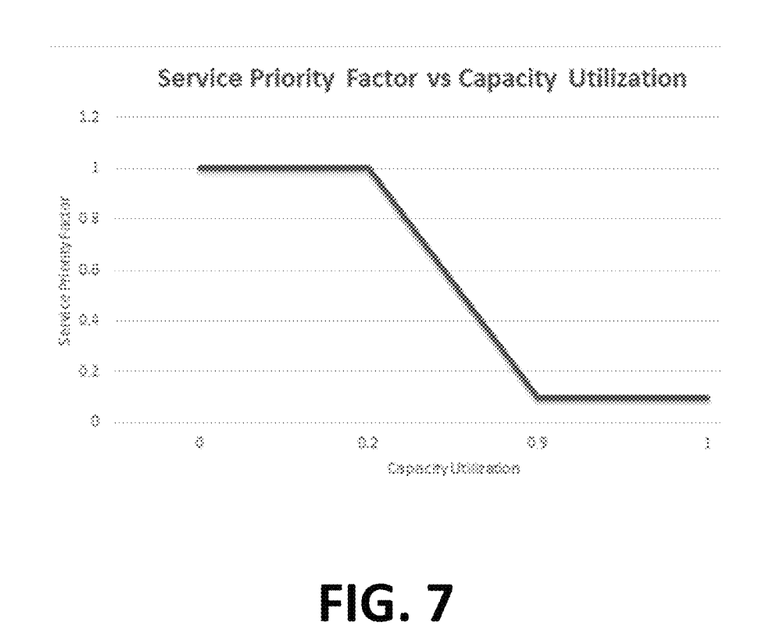
FIG. 7 is a data graph representing another example implementation of a service priority factor.

FIG. 7 is a data graph representing another example implementation of a service priority factor 512. In the second example, the service priority factor 512 is a linear function based on a capacity utilization of the beam. In this example implementation, the service priority factor remains at 1.0 when the capacity utilization remains below 0.2. Further, the service priority factor is set to 0.1 when the capacity utilization is at or above about 0.9. Between the capacity utilization of 0.2 and 0.9 the service priority factor changes linearly from 1.0 to 0.1. As capacity utilization increases, the service priority factor decreases and has a minimum so that aircraft on the ground are not starved for capacity.

The following examples illustrate the bandwidth manager 408 in conjunction with the network IP processors 504 providing bandwidth sharing between different providers/customers which share bandwidth per configured limits with the provider. Implementations may provide total capacity utilization against available capacity in real time for the applicable provider/customer. The aggregator 508 at the mobility NAP 210 takes capacity utilization into account to create the service priority factor. The network IP processors will use the service priority factor to reduce the service priority of any aircraft that are below the altitude threshold. The reason for using capacity utilization in determining service priority factor is to ensure normal service when there is available capacity, and to provide reduced service as higher utilization of the beam is approached.

We will now consider some examples of calculating the service priority factor based on altitude of aircraft operating within a beam of the satellite system using the priority factor as shown in FIG. 6. In a first example, we assume conditions as follows:
  Number of Aircraft above altitude threshold: 1
  Number of Aircraft below altitude threshold: 9
  Service Priority factor: 1.0 (As derived from the step function in FIG. 6) As a result of the above conditions, all aircraft operating within the beam get equal service or 100% of their configured plan.

Continuing the first example, we assume more aircraft come into the beam with many passengers using network resources resulting in the following conditions:
  Number of Aircraft above altitude threshold: 3
  Number of Aircraft below altitude threshold: 7
  Service Priority factor: 0.5 (As derived from the step function in FIG. 6)
As a result of the above conditions, aircraft above altitude threshold gets normal service, whereas aircraft below air get reduced service, 50% of their configured plan.

Continuing the first example, we assume one of the aircraft and is in air with many passengers using network resources resulting in the following conditions:
  Number of Aircraft above altitude threshold: 7
  Number of Aircraft below altitude threshold: 5
  Service Priority factor: 0.1 (As derived from the step function in FIG. 6)
As a result of the above conditions, aircraft above altitude threshold gets normal service, whereas aircraft below air get reduced service, 10% of their configured plan.

We will now consider a second example of calculating the service priority factor. In this example, the service priority factor is determined from the graph shown in FIG. 7. Using FIG. 7 to determine the service priority fact evolves using the slope of the line. For the example linear function of FIG. 7, the service priority factor is calculated as $(1-(UF-0.2)/(0.9-0.2)*(1-0.1))$, where UF is the utilization factor. In the second example, we assume the initial conditions as follows:
  Number of Aircraft above altitude threshold: 0
  Number of Aircraft below altitude threshold: 3
  Capacity Utilization: 0.1
  Service Priority factor: 1.0
As a result of the above conditions, all aircraft operating within the beam get equal service or 100% of their configured plan.

Continuing the second example, we assume one aircraft comes into the beam with many passengers using network resources resulting in the following conditions:
  Number of Aircraft above altitude threshold: 1
  Number of Aircraft below altitude threshold: 2
  Capacity Utilization: 0.5
  Service Priority factor: 0.614
Where the service priority factor is determined using the slope of the line in FIG. 7 and calculated as follows: $(1-(0.5-0.2)/(0.9-0.2)*(1-0.1))$.
As a result of the above conditions, aircraft above altitude threshold gets normal service, whereas aircraft below air get reduced service, 61.4% of their configured plan.

Continuing the second example, we assume one additional aircraft moves into the beam with passengers using network resources resulting in the following conditions:
  Number of Aircraft above altitude threshold: 2
  Number of Aircraft below altitude threshold: 2
  Capacity utilization: 0.8
  Service Priority factor: 0.228 (Using the slope of the line in FIG. 7)
As a result of the above conditions, aircraft above altitude threshold gets normal service, whereas aircraft below air get reduced service, 22.8% of their configured plan.

Figure 8:
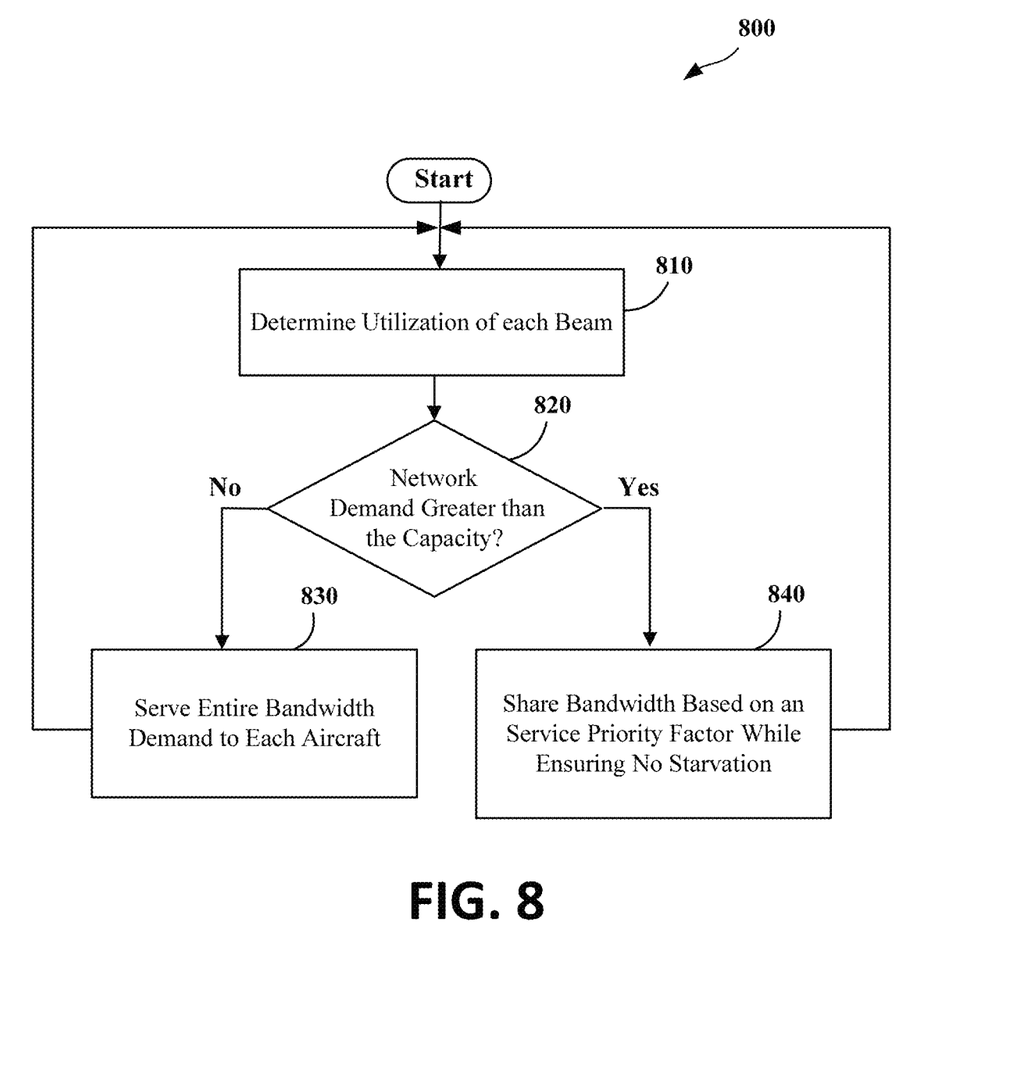
FIG. 8 is a sequence diagram illustrating a method for aeronautical satellite network systems in accordance with this disclosure.

FIG. 8 is a flow diagram of a process or method 800 for an aeronautical satellite network system to prioritize network service to aircraft based on environmental condition such as cruising altitude in accordance with this disclosure. Operations in the example method 800 could be performed by various entities in system 100. This is only for purposes of example and is not intended as a limitation regarding implementations and practices in accordance with this disclosure. First, the system determines utilization of available bandwidth of each beam (step 810). As multiple aircraft may come in an out of a beam, the utilization of the bandwidth of each beam may be constantly changing. The system may periodically monitor an average bandwidth utilization for the determination in step 810. The system then determines if the network demand is greater than the capacity in each beam (step 820). If the network demand is not greater than the capacity (step 820=no) then the system serves the entire bandwidth demand to each aircraft in the beam (step 830). If the network demand is greater than the capacity in a beam (step 820=yes) then the system serves shares bandwidth of the beam based on an environment-based service priority factor and demand for each aircraft while ensuring no starvation of any one aircraft (step 840).

Figure 9:
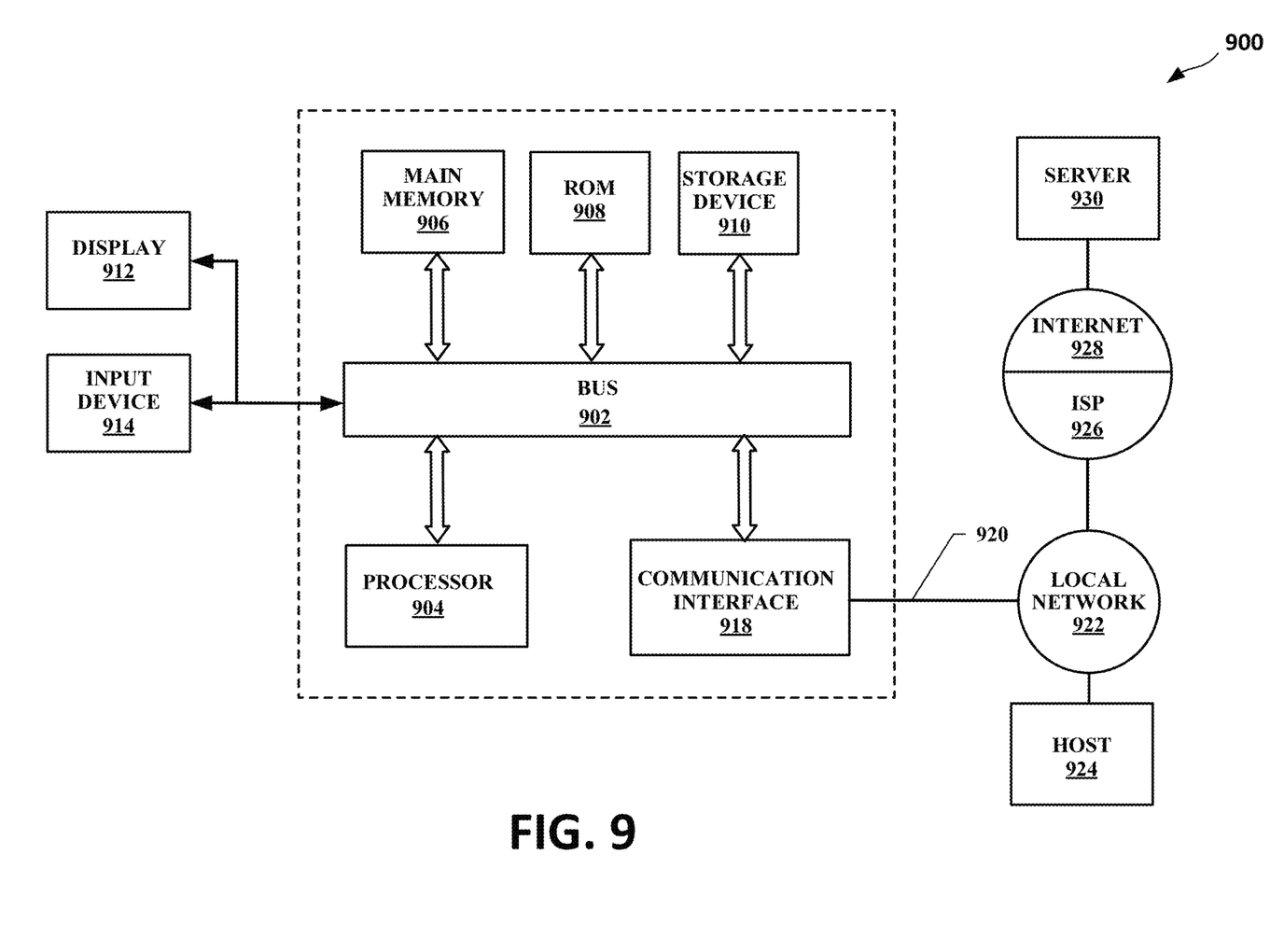
FIG. 9 is a block diagram showing an example computer system upon which aspects of this disclosure may be implemented.

FIG. 9 is a block diagram showing an example computer system 900 upon which aspects of this disclosure may be implemented. It will be understood that functional blocks illustrated in FIG. 9 are logical blocks, and do not necessarily correspond to particular hardware.

The computer system 900 may include a bus 902 or other communication mechanism for communicating information, and a processor 904 coupled with the bus 902 for processing information. The computer system 900 may also include a main memory 906, such as a random-access memory (RAM) or other dynamic storage device, coupled to the bus 902 for storing information and executable instructions to be executed by the processor 904. The executable instructions can include instruction that, when executed by the processor 904, cause the processor to perform operations in accordance with the flow diagram of FIG. 8. The main memory 906 may also be used for storing temporary variables or other intermediate information during execution of instructions to be executed by the processor 904. The computer system 900 may implement, for example, UT, SRAN, AMF, UPF, etc.

The computer system 900 may further include a read only memory (ROM) 908 or other static storage device coupled to the bus 902 for storing static information and instructions for the processor 904. A storage device 910, such as a flash or other non-volatile memory may be coupled to the bus 902 for storing information and instructions.

The computer system 900 may be coupled via the bus 902 to a display 912, such as a liquid crystal display (LCD), for displaying information. One or more user input devices, such as the example user input device 914 may be coupled to the bus 902, and may be configured for receiving various user inputs, such as user command selections and communicating these to the processor 904, or to the main memory 906. The user input device 914 may include physical structure, or virtual implementation, or both, providing user input modes or options, for controlling, for example, a cursor, visible to a user through display 912 or through other techniques, and such modes or operations may include, for example virtual mouse, trackball, or cursor direction keys.

The computer system 900 may include respective resources of the processor 904 executing, in an overlapping or interleaved manner, respective program instructions. Instructions may be read into the main memory 906 from another machine-readable medium, such as the storage device 910. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media may include, for example, optical or magnetic disks, such as storage device 910. Transmission media may include optical paths, or electrical or acoustic signal propagation paths, and may include acoustic or light waves, such as those generated during radio-wave and infra-red data communications, that are capable of carrying instructions detectable by a physical mechanism for input to a machine.

The computer system 900 may also include a communication interface 918 coupled to the bus 902, for two-way data communication coupling to a network link 920 connected to a local network 922. The network link 920 may provide data communication through one or more networks to other data devices. For example, the network link 920 may provide a connection through the local network 922 to a host computer 924 or to data equipment operated by an Internet Service Provider (ISP) 926 to access through the Internet 928 a server 930, for example, to obtain code for an application program.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

What is claimed is:

1. A method for prioritization in an aeronautical satellite network system, the method comprising:
   determining network utilization of a beam of the aeronautical satellite network system by a plurality of aircraft using network capacity of the beam;
   determining whether a demand in the beam indicated by network utilization is greater than the capacity of the beam;
   receiving a report of a number of the plurality of aircraft above and a number of the plurality of aircraft below an altitude threshold on a per beam basis;
   receiving a capacity utilization for the beam; and
   using the number of the plurality of aircraft above and the number of the plurality of aircraft below the altitude threshold and the capacity utilization for the beam to determine a service priority factor;
   upon determining the network demand in the beam indicated by the network utilization is greater than capacity of the beam, sharing network bandwidth of the beam to the plurality of aircraft based on the service priority factor that depends on altitude of the plurality of aircraft using network capacity in the beam.

2. The method according to claim 1, wherein the altitude threshold includes a hysteresis.

3. The method according to claim 1, wherein the service priority factor is a step function based on the number of the plurality of aircraft above and the number of the plurality of aircraft below the altitude threshold.

4. The method according to claim 1, wherein the service priority factor is a linear function based on a capacity utilization of the beam.

5. The method according to claim 1, further comprising:
   upon determining network demand in the beam is less than capacity, serving an entire bandwidth to each aircraft of the plurality of aircraft.

6. An aeronautical satellite network system comprising:
   a terrestrial gateway configured to communicate with a satellite;
   a mobility network access point configured to provide network resources to a plurality of aircraft through the terrestrial gateway;
   an aggregator configured to receive capacity utilization of network communication to the plurality of aircraft within a beam of the satellite and determine a service priority factor that depends on altitude of the plurality of aircraft in the beam,
   wherein the mobility network access point is configured to share network bandwidth of the beam to the plurality of aircraft based on the service priority factor; and
   wherein the aggregator is configured to receive a report of a number of the plurality of aircraft above and a number of the plurality of aircraft below an altitude threshold on a per beam basis and uses the number of the plurality of aircraft above and the number of the plurality of aircraft below the altitude threshold and the capacity utilization for the beam to determine the service priority factor.

7. The aeronautical satellite network system of claim 6, wherein the aggregator is further configured to use the capacity utilization for the beam to determine the service priority factor.

8. The aeronautical satellite network system of claim 6, further comprising:
   a plurality of network Internet Protocol (IP) processors;
   wherein the aggregator is configured to:
      receive capacity utilization reports of network utilization by the plurality of aircraft,
      create an aggregate report of network utilization,
      use the aggregate report to determine the service priority factor, and
      send the service priority factor to the network IP processors.

9. The aeronautical satellite network system of claim 8, wherein the plurality of network IP processors use the service priority factor to limit bandwidth to individual aircraft serviced by each of the plurality of network IP processors.

10. The aeronautical satellite network system of claim 6, wherein the altitude threshold includes a hysteresis.

11. The aeronautical satellite network system of claim 6, wherein the service priority factor is a step function based on the number of the plurality of aircraft above and the number of the plurality of aircraft below the altitude threshold.

12. The aeronautical satellite network system of claim 6, wherein the service priority factor is a linear function based on a capacity utilization of the beam.

13. The aeronautical satellite network system of claim 6, wherein the mobility network access point is configured to determine network demand in the beam is less than the capacity and serves an entire bandwidth to each aircraft of the plurality of aircraft.

14. An aeronautical satellite network system comprising:
   a terrestrial gateway configured to communicate with a satellite;
   a mobility network access point configured to provide network resources to a plurality of aircraft through the terrestrial gateway;
   a plurality of network IP processors in the mobility network access point;
   an aggregator configured to:
      receive network capacity utilization reports of network utilization by the plurality of aircraft,
      receive a report of a number of the plurality of aircraft above and a number of the plurality of aircraft below an altitude threshold on a per beam basis,
      use the number of the plurality of aircraft above and the number of the plurality of aircraft below the altitude threshold and the capacity utilization for the beam to determine a service priority factor, and
      send the service priority factor to the network IP processors;
   wherein the plurality of network IP processors are configured to use the service priority factor to limit bandwidth to individual aircraft of the plurality of aircraft serviced by each of the plurality of network IP processors.

15. The aeronautical satellite network system of claim 14, wherein the service priority factor is a step function based on the number of the plurality of aircraft above and the number of the plurality of aircraft below the altitude threshold.

16. The aeronautical satellite network system of claim 14, where the service priority factor is a linear function based on a capacity utilization of the beam.

17. The method according to claim 1, wherein the service priority factor is a weighting factor that is applied to available bandwidth to reduce bandwidth serving one or more aircraft to effectively share bandwidth among the plurality of aircraft.

18. The aeronautical satellite network system of claim 8, wherein the service priority factor is a weighting factor that is applied to available bandwidth to reduce bandwidth serving one or more aircraft to effectively share bandwidth among the plurality of aircraft.

19. The aeronautical satellite network system of claim 14, wherein the service priority factor is a weighting factor that is applied to available bandwidth to reduce bandwidth serving one or more aircraft to effectively share bandwidth among the plurality of aircraft.

\* \* \* \* \*